(12) United States Patent
Woelfel

(10) Patent No.: US 7,906,162 B2
(45) Date of Patent: Mar. 15, 2011

(54) ADHERENCE OF TEMPERATURE-SENSITIVE INCLUSIONS ON EDIBLE LIGHTWEIGHT CORES

(75) Inventor: Keith Woelfel, Sparta, NJ (US)

(73) Assignee: Mars Incorporated, McLean, VA (US)

( * ) Notice: Subject to any disclaimer, the term of this patent is extended or adjusted under 35 U.S.C. 154(b) by 1361 days.

(21) Appl. No.: 10/532,123

(22) PCT Filed: Oct. 21, 2003

(86) PCT No.: PCT/US03/33497
§ 371 (c)(1),
(2), (4) Date: Mar. 21, 2006

(87) PCT Pub. No.: WO2004/037013
PCT Pub. Date: May 6, 2004

(65) Prior Publication Data
US 2006/0204625 A1    Sep. 14, 2006

Related U.S. Application Data

(60) Provisional application No. 60/420,420, filed on Oct. 21, 2002.

(51) Int. Cl.
*A23P 1/08*    (2006.01)

(52) U.S. Cl. .............. 426/289; 426/89; 426/99; 426/302

(58) Field of Classification Search .................... 426/289
See application file for complete search history.

(56) References Cited

U.S. PATENT DOCUMENTS

| | | | | |
|---|---|---|---|---|
| 4,849,233 | A | * | 7/1989 | Hemker ........................ 426/93 |
| 4,910,031 | A | * | 3/1990 | Budd et al. ..................... 426/96 |
| 5,798,132 | A | | 8/1998 | Chen et al. ..................... 426/305 |
| 5,861,185 | A | | 1/1999 | Capodieci ..................... 426/238 |
| 5,871,793 | A | | 2/1999 | Capodieci ..................... 426/238 |

FOREIGN PATENT DOCUMENTS

| | | |
|---|---|---|
| DE | 3335781 A1 | 4/1985 |
| EP | 0 273 856 | 7/1988 |
| JP | 2000-014347 A | 1/2000 |
| WO | 00/54606 | 9/2000 |

OTHER PUBLICATIONS

"Fat Free Adhesion System for Snack Food Applications Using Kelsnax Gellan Gum Product", Product Formulation SS-7447, Monsanto Company, 1995.
"Brighter Baking with M&M's® Chocolate Mini Baking Bits", Publications International, Ltd., Lincolnwood, IL, pp. 78-79 (1996).

* cited by examiner

*Primary Examiner* — Carolyn A Paden
(74) *Attorney, Agent, or Firm* — Fitzpatrick, Cella, Harper & Scinto

(57) ABSTRACT

Temperature-sensitive inclusions are adhered to edible lightweight cores using an ambient temperature process.

20 Claims, No Drawings

ADHERENCE OF TEMPERATURE-SENSITIVE INCLUSIONS ON EDIBLE LIGHTWEIGHT CORES

This application is a 35 U.S.C. §371 of International Application No. PCT/US03/33497, filed Oct. 21, 2003, which claims the benefit of U.S. Provisional Patent Application No. 60/420,420 filed Oct. 21, 2002.

BACKGROUND OF THE INVENTION

1. Field of the Invention

The present invention relates to the adherence of temperature-sensitive inclusions on edible lightweight cores. The invention is directed to methods of adhering temperature-sensitive inclusions on edible lightweight cores, as well as to products made via such an adherence process. The invention generally relates to edible lightweight cores having temperature-sensitive inclusions adhered thereto. More particularly, the invention relates to the adherence of candy-shelled chocolate pieces on candy-coated popcorn.

2. Description of Related Art

Candy-coated popcorn such as Cracker Jack or Poppy Cock is a popular snack food. Traditional candy-coated popcorns conventionally comprise air- or oil-popped corn that is coated with a caramelized hot sugar syrup, which, upon cooling, gives the popcorn a crunchy candy coating. The sugar syrup is a solution of sugar typically comprising sucrose or other simple sugars; in making candy-coated popcorn, corn syrups are often added to the sugar syrup to control texture and balance sweetness. Temperatures of up to about 150° C. are typically used in the manufacture of a candy-coated popcorn.

Additionally, candy-coated popcorns many times also make use of a hot sugar syrup to adhere inclusions such as nuts to the popcorn. Again, temperatures of up to about 150° C. are typically used to manipulate a hot sugar syrup binder in the manufacture of a candy-coated popcorn containing inclusions. Such process temperatures, however, severely limit the type of inclusion which can be adhered to candy-coated popcorn.

Elevated temperatures such as those used in the conventional candy-coated popcorn inclusion adhering process will damage a number of potential inclusions which are temperature-sensitive. For example, any process temperature over about 30° C. will melt and de-temper chocolate and cause the melted chocolate to form a comingled, smeared popcorn mass; if the chocolate is in the form of a candy-shelled chocolate piece, such an elevated temperature will also crack the sugar shell causing the same popcorn mass. Such a jumbled mass is quite unappealing to consumers. Hence, there is a need to develop a method by which temperature-sensitive inclusions can be adhered to candy-coated popcorn.

U.S. Pat. No. 4,849,233 relates to meltable coating and binder compositions used to produce popcorn balls. A typical binder disclosed therein is a gelatin- or egg white-based marshmallow binder. The binder is applied in a temperature range of from about 50° C. to about 95° C. Such temperatures would immediately melt and damage chocolate or other temperature-sensitive inclusions.

EP 0 273 856 relates to coating anhydrous edible materials with sorbitol to produce a smooth, hard and crunchy film. Most typically, this process is employed to coat a core such as pellet gum. However, the core could be any substantially anhydrous edible or ingestible core capable of having a sorbitol coating applied to it; popcorn is disclosed as such a possible anhydrous core. The sorbitol used therein, however, is used as a film forming agent to coat the surface of a core and to provide visual and textural appeal; the sorbitol coating therein does not act as a binding agent. What is more, the sorbitol coating disclosed therein would not effectively adhere inclusions to pieces of candy-coated popcorn, especially inclusions which are heavy relative to the pieces of candy-coated popcorn.

U.S. Pat. No. 5,798,132 relates to a process of applying seasonings onto food products, particularly pretzels. The process involves a mixture of starch and oil dispersed in water. Such a mixture, also containing seasonings, is sprayed onto the food product, then heated at temperatures high enough to set the starch gel. Popcorn is mentioned as a possible substrate. Temperatures up to 90° C. are used; such temperatures would immediately melt chocolate or other temperature-sensitive inclusions.

Hence, there is clearly a need to develop a method of adhering temperature-sensitive inclusions onto candy-coated popcorn while maintaining a crunchy texture. Furthermore, the same need remains unfulfilled with regard to the adherence of temperature-sensitive inclusions on similar edible lightweight cores.

SUMMARY OF THE INVENTION

The present invention is directed to a method of adhering temperature-sensitive inclusions on edible lightweight cores comprising the steps of (a) coating the edible lightweight cores with a binder to form binder-coated edible lightweight cores; (b) mixing the binder-coated edible lightweight cores with temperature-sensitive inclusions to form an adhesive mass; and (c) drying the adhesive mass to form edible lightweight cores having temperature-sensitive inclusions adhered thereto.

In certain preferred embodiments of the present invention, the edible lightweight cores are selected from popcorn, crisp rice, extruded corn puffs, cereal, potato chips, granola, marshmallow and mixtures thereof. In more preferred embodiments, the edible lightweight cores are candy-coated. In a still more preferred embodiment of this invention, the edible lightweight expanded cores are candy-coated popcorn.

In preferred embodiments of the present invention, the method is carried out in an apparatus selected from a pan, a tube, a perforated drum, a fluidized bed and a belt coater. The use of a perforated drum is particularly preferred.

In preferred embodiments, the temperature-sensitive inclusions are selected from candy-shelled chocolate pieces, chocolate chips, nougat, caramel pieces, fondants, marshmallow and combinations thereof. In a particularly preferred embodiment, the temperature-sensitive inclusions are candy-shelled chocolate pieces.

In preferred embodiments of the present invention, drying steps are accomplished preferably by air drying with an air temperature ranging from 10° C. to 50° C.

In certain embodiments of the present invention, the method further comprises prior to step (a) the steps of (d1) treating the edible lightweight cores with a hydrophobic barrier composition; and (d2) drying the hydrophobic barrier composition In additional embodiments of the present invention, the method further comprises after step (c) the steps of (e1) applying a non-stick coating to said edible lightweight cores having temperature-sensitive inclusions adhered thereto; and (e2) drying said non-stick coating.

The present invention is further directed to edible lightweight cores having temperature-sensitive inclusions adhered thereto, made according to a process comprising the steps of (a) coating edible lightweight cores with a binder to form binder-coated edible lightweight cores; (b) mixing the binder-coated edible lightweight cores with temperature-sensitive inclusions to form an adhesive mass; and (c) drying the adhesive mass to form edible lightweight cores having temperature-sensitive inclusions adhered thereto.

The present invention is also directed to edible lightweight cores having temperature-sensitive inclusions adhered thereto.

DETAILED DESCRIPTION OF THE PREFERRED EMBODIMENTS

The present invention relates to the adherence of temperature-sensitive inclusions on edible lightweight, and preferably expanded, cores. In particular, a low or ambient temperature process is advantageously employed to adhere temperature-sensitive inclusions, preferably candy-shelled chocolate pieces, to edible lightweight cores, preferably candy-coated popcorn, without damage to or melting of the temperature-sensitive inclusions.

As used herein, the term "lightweight" generally means having a density lower than 1 g/cc, preferably lower than 0.8 g/cc, more preferably lower than 0.6 g/cc and most preferably lower than 0.4 g/cc. As used herein, "expanded" refers to a food which is typically formed by extrusion, air- or oil-popping or forming under vacuum; an expanded food is generally lightweight, puffy and crunchy. As used herein, the term "candy-coated popcorn" refers to air- or oil-popped corn that is coated with a caramelized hot sugar syrup, which, upon cooling, gives the popcorn a crunchy candy coating. As used herein the term "sugar syrup" refers to a solution of sugar, typically sucrose and/or other simple sugars, which may or may not also contain corn syrup. As used herein, the term "temperature-sensitive" refers to a tendency of a material to melt, liquefy or deform at temperatures greater than 50° C. As used herein, "inclusion" or "inclusions" refers to a discrete particle(s) having a size ranging from 0.1 to 30.0 mm; inclusions may or may not be candy-shelled. Exemplary candy-shelled inclusions include candy-shelled chocolate pieces; exemplary inclusions without a candy shell include chocolate chips, nougat, caramel pieces, fondants and marshmallow. As used herein, "adhere" means to stick on, hold fast or permanently attach. As used herein, "candy-shelled" refers to a composition having a sugar shell made by panning as known to those skilled in the art. As used herein, "water activity (Aw)" refers to a measure of the free, unbound water that is available for chemical and physical reactions in a given material and is essentially the equilibrium relative humidity (RH) for the product.

In a first aspect, the present invention is directed to a method of adhering temperature-sensitive inclusions onto edible lightweight cores. In the first step, edible lightweight cores are coated with a binder to form binder-coated edible lightweight cores. Preferably, coating is accomplished by spray coating or atomizing the binder and forming an even coating over the edible lightweight cores. During this step, the edible lightweight cores are mixed to evenly coat the surfaces thereof. The mixing typically occurs in a tumbling-type motion where the individual edible lightweight cores repeatedly pass over each other, evenly distributing the liquid binder over their exterior.

It is important to note that the first step, as well as all other steps of the method of the present invention, is preferably conducted at a temperature less than 50° C., more preferably less than 40° C., still more preferably less than 35° C., still further preferably less than 30° C. and most preferably less than 25° C. in order to avoid product deformation.

It is further important to note that the first step, as well as all other steps of the method of the present invention, can be accomplished in any suitable apparatus or vessel which is known in the art to distribute a material such as a binder over irregular shaped centers. Suitable apparatuses include, without limitation, a pan, a tube, a perforated drum, a fluidized bed and a belt coater. The use of a perforated drum is particularly preferred for the present invention. It is also important to note that a single apparatus can be employed for all steps of the method of the present invention or multiple apparatuses can be employed for different steps. When the first step of the present inventive method is carried out in a perforated drum, a rotational speed ranging preferably from about 2 to about 25 rpm, more preferably from about 4 to about 20 rpm and most preferably from about 8 to about 16 rpm, is employed.

Edible lightweight cores suitable for use in the present invention include, without limitation, popcorn, crisp rice, extruded corn puffs, cereal, potato chips, granola, marshmallow and mixtures thereof. Edible lightweight cores are commercially available or can be made using well-known procedures. The edible lightweight cores may be candy-coated, and, in a preferred embodiment of this invention, the edible lightweight cores are expanded and take the form of candy-coated popcorn, which is commercially available or can be made using well-known procedures. The edible lightweight cores suitable for use in the present invention preferably have a water activity (Aw) of less than 0.65, more preferably of less than 0.5, and most preferably of less than 0.35.

Typically binder is coated onto edible lightweight cores in an amount ranging from about 0.1% to about 15.0%, preferably from about 0.5% to about 12.0%, and most preferably from about 2.0% to about 10.0%, based on edible lightweight cores weight. It is best to use as little binder as possible in order to prevent potential migration of water from the binder to the edible lightweight cores. Such migration could impart a soggy texture to the overall product and cause undesirable toothpacking (adherence to teeth) upon consumption.

A binder suitable for use in the present invention must possess strong tack properties, impart minimal moisture to the overall product and dry at low process temperatures into a clear non-stick surface. First, the binder must have sufficient adhesive strength to adhere inclusions to irregular edible lightweight core surfaces; many times, the inclusions are much heavier than the edible lightweight core. Binders suitable for use in this invention preferably adhere from about 50% to about 100%, more preferably about 75% to about 100%, and most preferably from about 90% to about 100%, of the temperature-sensitive inclusions attempted to be adhered thereto.

Second and preferably, the binder has a water activity (Aw) preferably ranging from about 0.10 to about 0.60, more preferably from about 0.15 to about 0.50, and most preferably from about 0.20 to about 0.40; however, binders having higher water activities can be effective binders in the present invention, as additional precautions can be taken against the migration of water from the binder to the edible lightweight cores as discussed below.

Third, the binder preferably comprises a material which air dries into a clear non-stick surface at low temperatures, i.e., between 20° C. and 50° C., in order to avoid damage or melting of the inclusions. In a preferred embodiment of the present invention, the temperature-sensitive inclusions comprise chocolate and the binder must dry at even lower temperatures, i.e., between 20° C. and 30° C.

The binder comprises water, a film former and an adhesive agent. Preferably the binder comprises an amount of water ranging from about 10% to about 95%, more preferably from about 15% to about 90%, and most preferably from about 25% to about 85% by weight of the binder. Preferably the binder comprises an amount of film former ranging from about 0.5% to about 70%, more preferably from about 3% to about 50%, and most preferably from about 5% to about 30% by weight of the binder. Preferably the binder comprises an amount of adhesive agent ranging from about 0.5% to about 70%, more preferably from about 3% to about 50%, and most preferably from about 5% to about 50% by weight of the binder.

Film formers suitable for use in the present invention include, without limitation, carbohydrates (starches, pectins, guar gum, gum arabic, dextrin, cyclodextrin, maltodextrin, cyclodextrin carrageenan, hydroxy propyl methyl cellulose), proteins (whey, corn zein, soy, collagen), lipids (oils and waxes), resins (shellacs), and mixtures thereof; preferably the film former is starch. Upon drying and subsequent film formation, the film structure is formed. The resulting clear film provides gloss, acts as a topcoat sealant (e.g., against moisture migration) for the inclusions and the edible lightweight cores, and minimizes the loss of inclusions during packaging, distribution and consumer handling.

Adhesive agents suitable for use in the present invention include, without limitation, starches, pectins, guar gum, gum arabic, xanthan gum, dextrin, cyclodextrin, maltodextrin, cyclodextrin carrageenan, and mixtures thereof; preferably the adhesive agent is maltodextrin. Generally, an adhesive agent acts as a "glue" in the binder. When dense and/or heavy inclusions are to be adhered to the edible lightweight cores, an adhesive agent which would impart strong tack properties to the binder is desirable.

Preferably, the film former and the adhesive agent are different.

According to a preferred embodiment of the present invention, the binder comprises water, starch and maltodextrin. In certain preferred embodiments of the present invention, the ratio of starch to maltodextrin ranges from a 4:1 ratio of starch to maltodextrin to a 0.2:1 ratio of starch to maltodextrin. A 1.4:1 ratio of starch to maltodextrin is particularly preferred.

Additionally, the binder may contain additional ingredients which may serve to affect the overall texture of the product, i.e., produce a crispy or crunchy texture. Suitable additional ingredients may include, without limitation, glycerin, sucrose, dextrose, fructose and combinations thereof; such additional ingredients are preferably added in an amount ranging from about 0.5% to about 30%, more preferably about 1% to about 25%, further more preferably about 3% to about 20%, still further preferably about 5% to about 15%, and most preferably about 7% to about 10% based on binder weight. Glycerin and fructose act as water activity suppressors. Sucrose and dextrose are crystallization sugars. Both water activity suppressors and crystallization sugars contribute to the production of a crunchy or crispy product texture, though by different mechanisms. It is important to note, however, that the addition of an additional ingredient to the binder may affect, i.e., increase or decrease, the viscosity of the resultant binder and therefore its ability to be useful in a spray coating application; for example, glycerin would decrease the viscosity of a binder and accordingly increase its usefulness in a spray coating application. It should also be noted that when using candy-coated edible lightweight cores, the candy-coating may be specially formulated to deliver extra crunch so as to compensate for potential water migration from the binder to the edible lightweight cores.

In the second step of the process of applying temperature-sensitive inclusions onto edible lightweight cores, temperature-sensitive inclusions are mixed with the binder-coated edible lightweight cores to form an adhesive mass. The temperature-sensitive inclusions are preferably metered in very quickly in order to minimize the time that the edible lightweight cores are exposed to the wet binder; however, the inclusions may be added stepwise or in any other suitable manner. It is critical that the temperature-sensitive inclusions and the binder-coated edible lightweight cores be agitated in such a manner as to allow for pick up of the inclusions by the edible lightweight cores. Preferably, agitation takes the form of tumbling. It is important to note that slow agitation is critical for inclusion pick up; however, agitation that is too slow will cause clustering of the edible lightweight cores. Additionally, the process temperature for this step preferably ranges from about 10° C. to about 50° C., more preferably from about 15° C. to about 45° C., and most preferably from about 20° C. to about 35° C.

When the second step of the present inventive method is carried out in a perforated drum, a rotational speed ranging preferably from about 0.25 to about 20 rpm, more preferably from about 0.5 to about 15 rpm and most preferably from about 1 to about 10 rpm, is employed. During this second mixing step, rotational speed should be systematically reduced within the above-noted ranges to aid in the adhesion process; too high a rotational speed will cause centrifugal separation of the inclusions (heavier) from the edible lightweight cores (lighter), and too slow a rotational speed will cause edible lightweight core clustering.

Temperature-sensitive inclusions suitable for use in the present invention include, but are not limited to, candy-shelled chocolate pieces, chocolate chips, nougat, caramel pieces, fondants and marshmallow. Preferably, the inclusions are candy-shelled chocolate pieces. Typically, temperature-sensitive inclusions are added to binder-coated edible lightweight cores in an amount ranging preferably from about 5% to about 95%, more preferably from about 10% to about 85%, and most preferably from about 15% to about 75%, based on binder-coated edible lightweight core weight. Typically, temperature-sensitive inclusions have a particle size ranging preferably from about 0.1 mm to about 30.0 mm, more preferably from about 0.2 mm to about 15.0 mm, and most preferably from about 0.3 mm to about 10.0 mm.

In the final step of the method of the present invention, the adhesive mass of binder-coated edible lightweight cores and temperature-sensitive inclusions is dried to form edible lightweight cores having temperature-sensitive inclusions adhered thereto. In a preferred embodiment, drying is accomplished by air drying using a high volume, low temperature air flow. Preferably the air volume ranges from about 25 CFM (cubic feet per minute) to about 1000 CFM, preferably from about 50 CFM to about 800 CFM, and most preferably from about 75 CFM to about 600 CFM. Preferably the air temperature ranges from about 10° C. to about 50° C., more preferably from about 15° C. to about 45° C., and most preferably from about 20° C. to about 35° C. Preferably the relative humidity of the air is less than or equal to 60%, more preferably less than or equal to 50%, further more preferably less than or equal to 40%, still further preferably less than or equal to 30%, still further more preferably less than or equal to 20%, and most preferably less than 10%, as measured at 27° C. However, it is critical that the adhesive mass be agitated in such a manner as to prevent edible lightweight core clustering during the drying process. Preferably, agitation takes the form of tumbling. The tumbling is controlled to prevent clustering of the edible lightweight cores while drying. If tumbling or agitation is too little, then clustering will occur. Agitation must, however, be gentle; if tumbling is too fast, then the inclusions will be knocked loose from the edible lightweight cores. When this final step of the present inventive method is performed in a perforated drum, the rotational speed is preferably maintained at 1 to 2 rpm to keep the inclusions in place until the binder is set up and fully dried.

Additional optional process steps may be used in order to decrease the amount of water which may undesirably be imparted to the edible lightweight cores from the binder. First, in certain preferred embodiments, the edible lightweight cores are pre-treated with a hydrophobic barrier composition prior to being coated with the adhesive binder. Suitable hydrophobic barrier compositions include, without limitation, resins such as shellac, proteins, lipids, waxes, carbohydrates and mixtures thereof.

Preferably, pre-treatment is accomplished by spray coating, atomizing or dribbling the hydrophobic barrier composition or by submersion in the hydrophobic barrier composition to form an even coating over the edible lightweight cores and then drying the hydrophobic barrier composition. In fact, submersion of the edible lightweight cores in the hydrophobic barrier composition may be preferred when using irregularly shaped cores in order to obtain an even coating. Typically hydrophobic barrier composition is coated onto edible lightweight cores in an amount ranging from about 0.1% to about 10.0%, preferably from about 0.5% to about 8.0%, and most preferably from about 1.0% to about 6.0%, based on edible lightweight cores weight. After allowing time for the hydrophobic barrier composition to roll-in, i.e., about 5 minutes, drying is accomplished using any suitable means.

In a second preferred embodiment of the present inventive process, a non-stick coating is applied to the edible lightweight cores having temperature-sensitive inclusions adhered thereto as a final step. Suitable non-stick coatings include, without limitation, lecithin, resins, proteins, lipids, stearic acid, waxes, carbohydrates such as dextrin, and mixtures thereof.

Preferably, non-stick coating is accomplished by spray coating or atomizing the non-stick coating and forming an even coating over the edible lightweight cores having the temperature-sensitive inclusions adhered thereto and then drying the non-stick coating. Preferably the non-stick coating is coated onto the edible lightweight cores having temperature-sensitive inclusions adhered thereto in an amount ranging from about 0.1% to about 10.0%, more preferably from about 0.5% to about 8.0%, and most preferably 1.0% to about 6.0%, based on the weight of the finished edible lightweight cores having temperature-sensitive inclusions adhered thereto.

After allowing time for the non-stick coating to evenly coat the edible lightweight cores having temperature-sensitive inclusions adhered thereto, i.e., about 5 minutes, drying is preferably accomplished by air drying using a medium volume, low temperature air flow. Preferably the air volume ranges from about 25 CFM (cubic feet per minute) to about 1000 CFM, preferably from about 50 CFM to about 800 CFM, and most preferably from about 75 CFM to about 600 CFM. Preferably the air temperature ranges from about 10° C. to about 50° C., more preferably from about 15° C. to about 45° C., and most preferably from about 20° C. to about 35° C. Preferably the relative humidity of the air is less than or equal to 60%, more preferably less than or equal to 50%, further more preferably less than or equal to 40%, still further preferably less than or equal to 30%, still further more preferably less than or equal to 20%, and most preferably less than 10%, as measured at 27° C. However, it is critical that the edible lightweight cores having temperature-sensitive inclusions adhered thereto be agitated in such a manner as to prevent clustering until the non-stick coating is dry.

In a second aspect, the present invention is directed to edible lightweight, and preferably expanded, cores having temperature-sensitive inclusions adhered thereto made according to the above-described process.

In a third aspect, the present invention is directed to edible lightweight, and preferably expanded, cores having temperature-sensitive inclusions adhered thereto. In other words, the present invention is broadly directed to any edible lightweight cores which have temperature-sensitive inclusions adhered thereto as defined above. In certain preferred embodiments, the edible lightweight cores having temperature-sensitive inclusions adhered thereto have a core moisture content preferably ranging from about 0.9% to about 5.0%, more preferably from about 1.2% to about 4.0%, and most preferably from about 1.5% to about 3.0%; if the moisture content is higher, the edible lightweight cores will be soggy and will cause toothpacking upon consumption.

The examples which follow are intended as an illustration of certain preferred embodiments of the invention, and no limitation of the invention is implied.

Example 1

Preparation of Candy-Coated Popcorn Having Candy-Shelled Chocolate Pieces Adhered Thereto A candy-coated popcorn having candy-shelled chocolate pieces adhered thereto was acquired using the ingredients listed in Table 1 below.

TABLE 1

| ingredient | % by weight |
| --- | --- |
| candy-coated popcorn* | 44 |
| shellac | 3 |
| M&M's ® Semi-Sweet Chocolate Mini Baking Bits | 44 |
| adhesive binder** | 7 |
| non-tack film*** | 2 |
| total | 100 |

*candy-coating is 2/3 sucrose and 1/3 42 DE corn syrup by weight
**11% 18 DE maltodextrin, 18% Pure Kote starch and 71% water; Aw = 0.95
***1/3 dextrin and 2/3 water In a perforated coating drum maintained at a temperature no greater than 28° C., shellac was atomized (50 psi pump, 50 psi spray pattern (Spray Dynamics)) onto candy-coated popcorn to pre-treat the popcorn surface; the rotational speed was high (14 rpm), and no air flow was maintained. After allowing the shellac to roll-in for five minutes, the shellac-coated candy-coated popcorn was dried for ten minutes under a moderate air flow (27° C.; dryness=2.0 g moisture/kg air), while a low rotational speed was maintained (7 rpm). Then, the candy-coated popcorn was coated with the adhesive binder, while maintaining a high rotational speed (14 rpm) and no air flow for five minutes; the candy-coated popcorn was tumbled to facilitate coating. Next, M&M's® Semi-Sweet Chocolate Mini Baking Bits were added to the tumbling mass of binder-coated candy-coated popcorn. As the M&M's® Semi-Sweet Chocolate Mini Baking Bits were added, the rotational speed was systematically reduced to begin the adhering process (from 14 rpm to 10 rpm to 4 rpm to 2 rpm over the course of 5 minutes). Next, the binder was dried under a high speed air flow (400 CFM; 27° C.) for 15 minutes. During drying, a low rotational speed was maintained (2 rpm), and horizontal mixing bars and slow tumbling were used to prevent popcorn clustering. Then, a dextrin film was formed over the candy-coated popcorn having M&M's®

Semi-Sweet Chocolate Mini Baking Bits adhered thereto under an air flow (200 CFM; 27° C.) and with a medium rotational speed (4 rpm) for three minutes. Finally, the candy-coated popcorn having M&M's® Semi-Sweet Chocolate Mini Baking Bits adhered thereto was dried under a medium speed air flow (200 CFM; 27° C.) and with a low rotational speed (2 rpm) for 5 minutes. The finished product was individual pieces of candy-coated popcorn with lentil-shaped mini M&M's® randomly adhered thereto. The finished product was colorful, glossy and crunchy.

Comparative Example 1

Attempted Preparation of Candy-Coated Popcorn Having Candy-Shelled Chocolate Pieces Adhered Thereto Using Hot Sugar Syrup Process First, popcorn was hot oil- or hot air-popped. Next, a blend of sugar and corn syrup was boiled to about 150° C. Third, the popcorn and hot sugar syrup were quickly mixed together. Then, candy-shelled chocolate pieces were added in an effort to adhere them to the popcorn. An undistinguishable mass of popcorn, cracked candy shells and melted chocolate resulted.

Other variations and modifications of this invention will be obvious to those skilled in this art. This invention is not to be limited except as set forth in the following claims.

What is claimed is:

1. A method of adhering temperature-sensitive inclusions on edible lightweight cores comprising the steps of:
    (a) coating edible lightweight cores with a binder to form binder-coated edible lightweight cores;
    (b) mixing the binder-coated edible lightweight cores with temperature-sensitive inclusions to form an adhesive mass; and
    (c) drying the adhesive mass to form edible lightweight cores having temperature-sensitive inclusions adhered thereto;
    wherein steps (a), (b) and (c) are carried out at a temperature of less than 50° C.;
    wherein the process further comprises, prior to step (a), the steps of (d1) treating the edible lightweight cores with a hydrophobic barrier composition and (d2) drying the hydrophobic barrier composition; and
    wherein the temperature-sensitive inclusions are selected from the group consisting of candy-shelled chocolate pieces, chocolate chips, nougat, caramel pieces, fondants, marshmallow and combinations thereof.

2. The method according to claim 1, wherein the edible lightweight cores are selected from the group consisting of popcorn, crisp rice, extruded corn puffs, cereal, potato chips, granola, marshmallow and mixtures thereof.

3. The method according to claim 2, wherein the edible lightweight cores are candy-coated.

4. The method according to claim 1, wherein the edible lightweight cores have a water activity of less than 0.65.

5. The method according to claim 1, wherein the binder comprises water, a film former and an adhesive agent.

6. The method according to claim 5, wherein the film former is starch and wherein the adhesive agent is maltodextrin.

7. The method according to claim 1, wherein the binder has a water activity ranging from 0.10 to 0.60.

8. The method according to claim 1, wherein the temperature-sensitive inclusions are candy-shelled chocolate pieces.

9. The method according to claim 1, wherein the process further comprises, after step (c), the steps of (e1) applying a non-stick coating to the edible lightweight cores having temperature-sensitive inclusions adhered thereto and (e2) drying the non-stick coating.

10. Edible lightweight cores having temperature-sensitive inclusions adhered thereto, made according to a process comprising the steps of:
    (a) coating edible lightweight cores with a binder to form binder-coated edible lightweight cores;
    (b) mixing the binder-coated edible lightweight cores with temperature-sensitive inclusions to form an adhesive mass; and
    (c) drying the adhesive mass to form edible lightweight cores having temperature-sensitive inclusions adhered thereto;
    wherein steps (a), (b) and (c) are carried out at a temperature of less than 50° C.;
    wherein the process further comprises, prior to step (a), the steps of (d1) treating the edible lightweight cores with a hydrophobic barrier composition and (d2) drying the hydrophobic barrier composition; and
    wherein the temperature-sensitive inclusions are selected from the group consisting of candy-shelled chocolate pieces, chocolate chips, nougat, caramel pieces, fondants, marshmallow and combinations thereof.

11. Edible lightweight cores according to claim 10, wherein the process further comprises, after step (c), the steps of (e1) applying a non-stick coating to the edible lightweight cores having temperature-sensitive inclusions adhered thereto and (e2) drying the non-stick coating.

12. Edible lightweight cores having temperature-sensitive inclusions adhered thereto,
    wherein the edible lightweight cores are coated with a binder comprising water, a film former and an adhesive agent,
    wherein the edible lightweight cores are coated with a hydrophobic barrier composition,
    wherein the temperature-sensitive inclusions are selected from the group consisting of candy-shelled chocolate pieces, chocolate chips, nougat, caramel pieces, fondants, marshmallow and combinations thereof, and
    wherein the binder is coated onto the edible lightweight cores at a temperature of less than 50° C.

13. The edible lightweight cores according to claim 12, wherein the edible lightweight cores are selected from the group consisting of popcorn, crisp rice, extruded corn puffs, cereal, potato chips, granola, marshmallow and mixtures thereof.

14. The edible lightweight cores according to claim 12, wherein the edible lightweight cores have a water activity of less than 0.65.

15. The edible lightweight cores according to claim 12, wherein the film former is starch and wherein the adhesive agent is maltodextrin.

16. The edible lightweight cores according to claim 12, wherein the binder has a water activity ranging from 0.10 to 0.60.

17. The edible lightweight cores according to claim 12, wherein the temperature-sensitive inclusions are candy-shelled chocolate pieces.

18. Edible lightweight cores according to claim 12, wherein the edible lightweight cores are coated with a non-stick coating.

19. Individual edible lightweight cores of popcorn, each having one or more temperature-sensitive inclusions of candy-shelled chocolate pieces adhered thereto, wherein the edible lightweight cores are coated with a binder comprising water, a film former and an adhesive agent,
wherein the edible lightweight cores are coated with a hydrophobic barrier composition, and
wherein the binder is coated onto the edible lightweight cores at a temperature of less than 50° C.

20. Individual edible lightweight cores according to claim 19, wherein the edible lightweight cores are coated with a non-stick coating.

* * * * *